United States Patent
Hsiung et al.

(10) Patent No.: US 7,492,413 B2
(45) Date of Patent: Feb. 17, 2009

(54) DATA RECEIVING APPARATUS AND METHOD IN A VBI RECEIVER

(75) Inventors: Chia-Hao Hsiung, Taipei (TW); Yi-Shu Chang, Tainan (TW); Ting-Yang Chang, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 553 days.

(21) Appl. No.: 11/142,932

(22) Filed: Jun. 2, 2005

(65) Prior Publication Data

US 2005/0270420 A1    Dec. 8, 2005

(51) Int. Cl.
*H04N 7/00* (2006.01)

(52) U.S. Cl. ........................................ 348/465
(58) Field of Classification Search ............. 348/465, 348/468, 460, 461, 614, 731, 552, 553, 467, 348/473, 478, 423.1; 375/355, 371, 240.01
See application file for complete search history.

(56) References Cited

U.S. PATENT DOCUMENTS

| | | | | |
|---|---|---|---|---|
| 5,040,211 A * | 8/1991 | Schreiber | ................... | 380/214 |
| 5,493,339 A * | 2/1996 | Birch et al. | ................. | 348/461 |
| 6,005,632 A * | 12/1999 | Cahill, III | ................... | 348/465 |
| 6,806,910 B2 * | 10/2004 | Hebbalalu et al. | .......... | 348/465 |
| 6,907,096 B1 * | 6/2005 | Lueker et al. | .............. | 375/355 |
| 6,959,058 B2 * | 10/2005 | Yoo et al. | ................... | 375/355 |
| 7,198,197 B2 * | 4/2007 | Best | .......................... | 235/492 |

* cited by examiner

*Primary Examiner*—Paulos M Natnael
(74) *Attorney, Agent, or Firm*—Thomas, Kayden, Horstemeyer & Risley

(57) ABSTRACT

A VBI receiver and method is disclosed. The receiver includes an over-sampling circuit, a transition detector, a data selector, and a data output device. The over-sampling circuit is for over-sampling VBI data and outputting and over-sampled signal. The transition detector is for detecting the transition of the over-sampled signal and outputting a transition signal representing the transition position. The data selector is for recording the transition signal and outputting a position signal according to the transition signal and at least a previous transition signal. The data output device outputs digital output data from the over-sampled signal according to the position signal.

20 Claims, 4 Drawing Sheets

DATA RECEIVING APPARATUS AND METHOD IN A VBI RECEIVER

This application claims the benefit of Taiwan application Ser. No. 93115963, filed Jun. 3, 2004, the subject matter of which is incorporated herein by reference.

BACKGROUND OF THE INVENTION

1. Field of the Invention

The invention relates in general to a TV information system and data receiving method, and more particularly to a VBI receiver and the related method.

2. Description of the Related Art

In a TV information system, data of climate, news, stock markets, and programs, after digitally encoded, are packed in the vertical blanking interval (VBI) of a TV signal, and then broadcasted via a wireless or cable TV station. This kind of TV information is ordinarily called VBI data. The TV information receiver at the receiving terminal receives the TV broadcast signal, catches the encoded data string from the VBI, and decodes the data string to recover the original data content. Afterward, the information service contents can be selected or inquired via a remote control as needed.

FIG. 1 is a block diagram of a conventional TV information decoding system. The TV information decoding system includes a front-end circuit 110, a VBI decoder 120 and a TV decoder 130. ATV broadcast signal received though an antenna is demodulated to be a baseband video signal by the front-end circuit 110, while the baseband video signal is decoded to become VBI data by the VBI decoder 120. Afterwards, the VBI data output by the VBI decoder 120 is received and transmitted to a mixer 134 by the VBI receiver 133, where the VBI data is combined with the video information to be displayed on a TV monitor. However, when the VBI data are transmitted to the TV decoder 130 by the VBI decoder 120, only the signal Vsync is served as field synchronization mechanism and the signal Hsync as linear synchronization mechanism between the VBI decoder 120 and the TV decoder 130. Therefore, the accuracy of VBI data received by the VBI receiver 133 of the TV decoder 130 requires further improvement.

SUMMARY OF THE INVENTION

It is therefore an object of the invention to provide a video decoding system for over-sampling an input signal and method of the same. Therefore, better and more stable sampling data can be obtained.

The invention achieves the above-identified object by providing a data receiving apparatus including an over-sampling circuit, a transition detector, a data selector, and a data output device. The over-sampling circuit is for over-sampling digital data and outputting a number of over-sampled signals. The transition detector is for detecting the transition of the over-sampled signals, and outputting a transition signal representing the transition position. The data selector, coupled to the transition detector, is for recording the transition signal and outputting a position signal according to the present transition signal and at least a previous transition signal. The data output device, coupled to the data selector, is for outputting digital output data from the over-sampled signals according to the position signal.

The invention achieves the above-identified object by providing a data recovering method. The method includes over-sampling digital data to generate an over-sampled signal; detecting the transition of the over-sampled signal and outputting a transition signal representing the transition position; outputting a sampling position signal according to the transition signal and at least a previous transition signal; and outputting digital output data from the over-sampled signal according to the sampling position signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
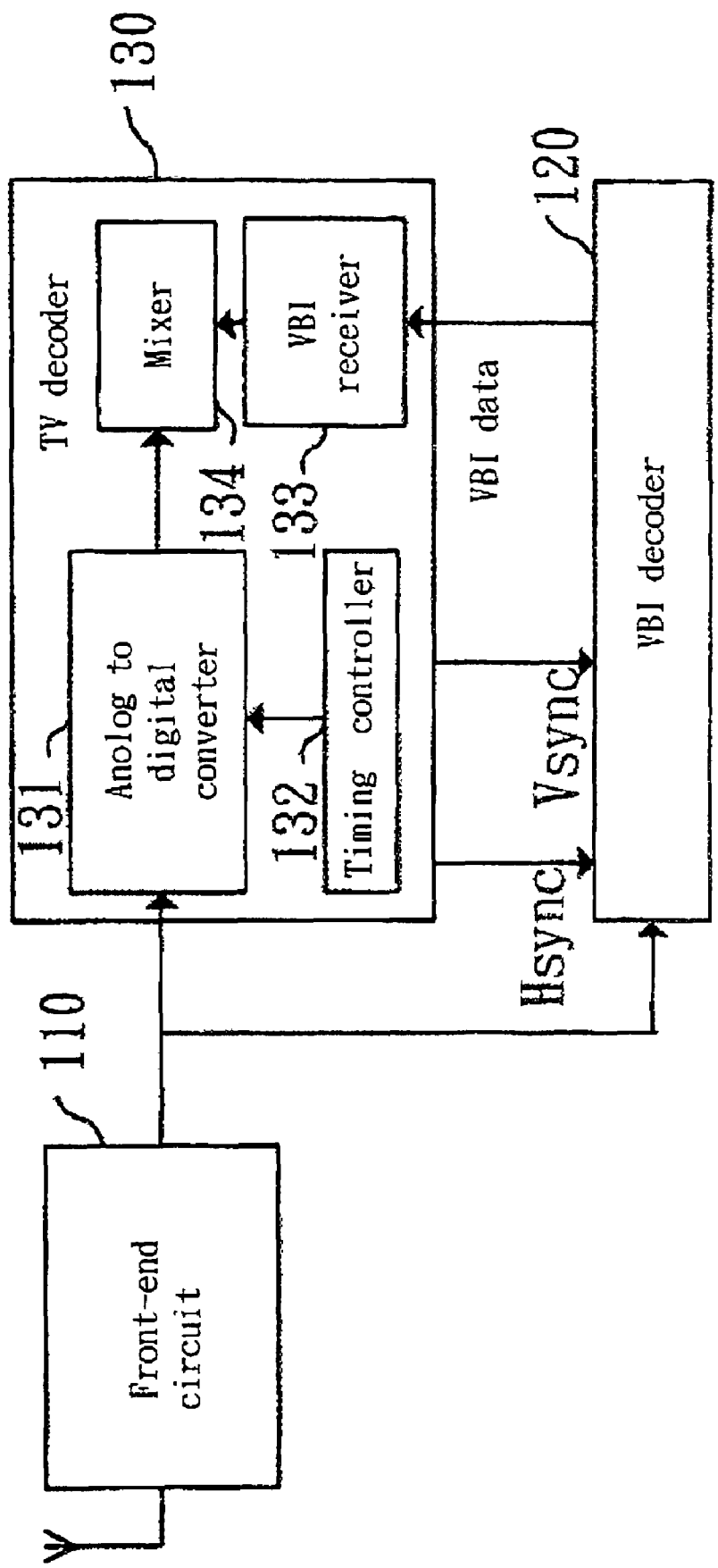
FIG. 1 is a block diagram of a conventional TV information decoding system.
Figure 2:
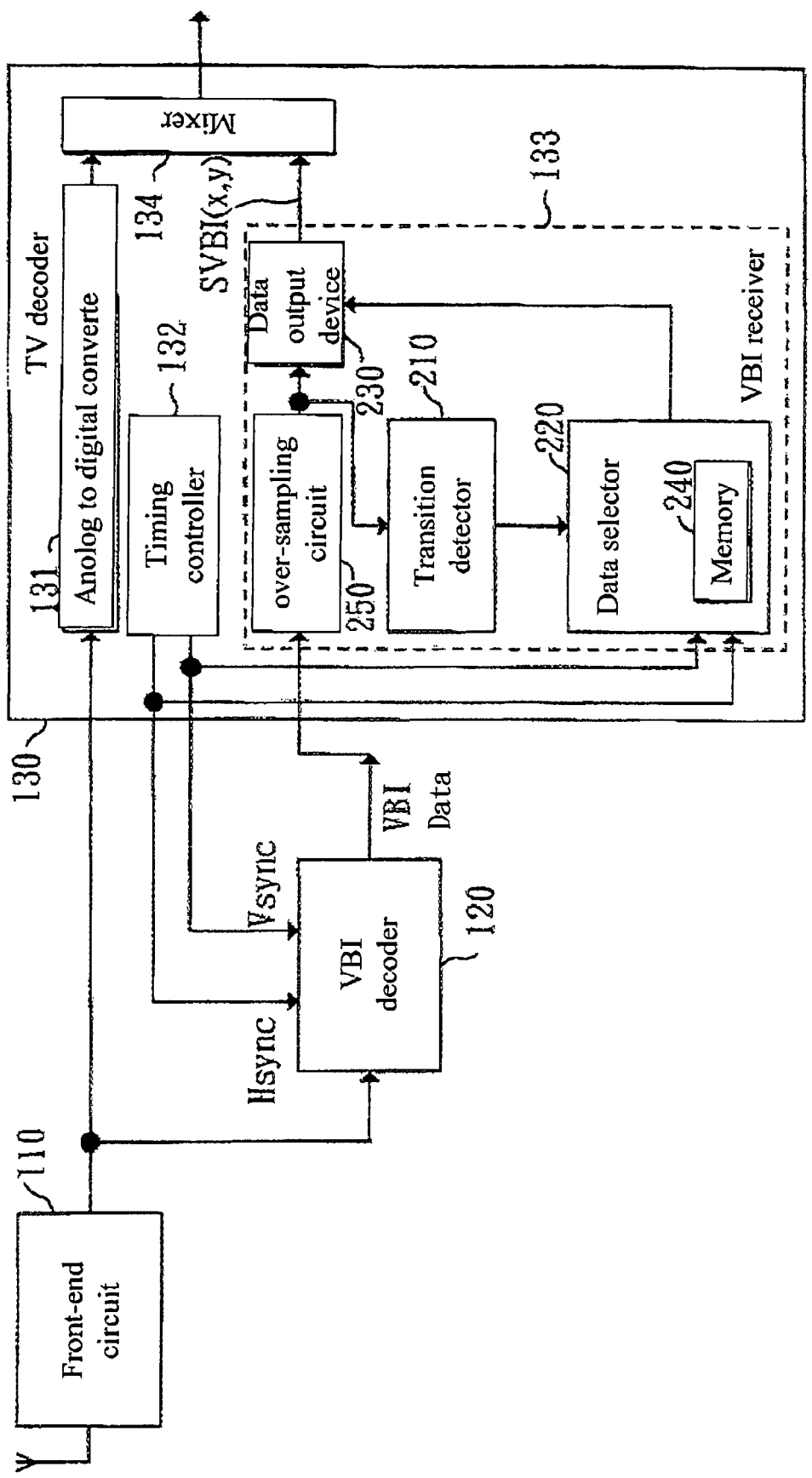
FIG. 2 is a block diagram of a data receiving apparatus according to a preferred embodiment of the invention.

Referring to FIG. 2, a block diagram of a data receiving apparatus according to a preferred embodiment of the invention is shown. The data receiving apparatus over-samples the input signal (VBI data) by using over-sampling frequency. The apparatus includes an over-sampling circuit 250, a transition detector 210, a data selector 220, a data output device 230 and a memory 240.

In order to facilitate the description, four-time sampling frequency is taken as an example in the following embodiment, however, the scope of the invention is not limited thereto. The over-sampling circuit 250 over-samples digital data by four-time over-sampling frequency and outputs an over-sampled signal accordingly. In the embodiment, the over-sampling is performed on the VBI data output from the VBI decoder 120 by the four-time frequency. The transition detector 210 is for detecting the transition of the over-sampled signal and outputting a transition signal representing the transition position. The data selector 220 coupled to the transition detector 210 is for recording the transition signal and outputting a position signal according to the present transition signal and at least a previous transition signal. The data selector 220 further includes a memory 240 for storing the transition signal. The data output device 230, coupled to the data selector 220, outputs digital output data from the over-sampled signal according to the position signal.

Figure 3:
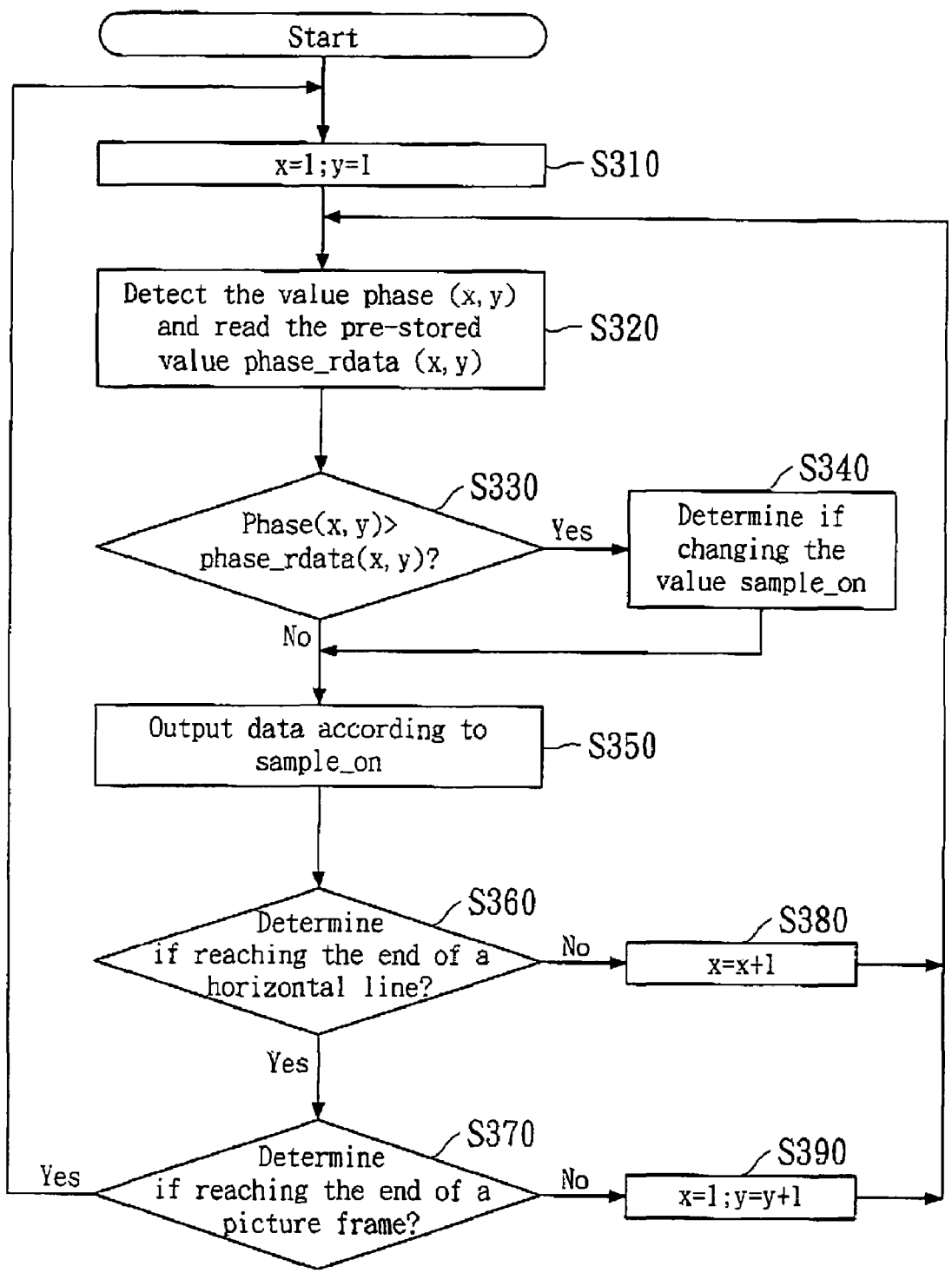
FIG. 3 is a flow chart of a video decoding method for over-sampling the input signal.
Figure 4:
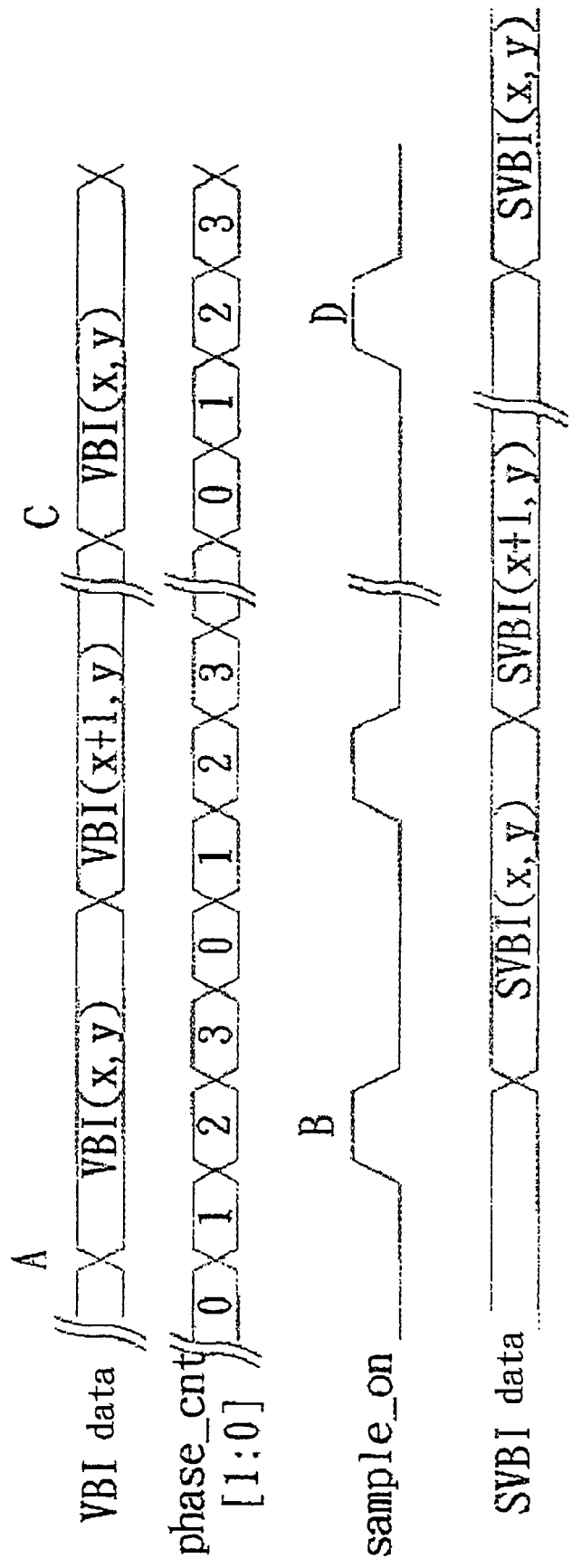
FIG. 4 is a timing diagram related to the method of FIG. 3.

FIG. 3 is a flow chart of a video decoding method for over-sampling the input signal and FIG. 4 is a timing diagram related to the method of FIG. 3. Referring to FIG. 3 and FIG. 4 simultaneously, in the embodiment, a stable video signal can be obtained by using four-time over-sampling frequency to over-sample the input signal.

First, in step S310, perform an initialization process by setting the initial value of x and y to be 1, wherein x refers to the position of a pixel on a horizontal line, and y refers to the position of a horizontal line in a picture frame. In the meanwhile, over-sample a video input signal (VBI data) to generate an over-sampled signal.

In step S320, detect the transition of the over-sampled signal, output a transition signal phase(x,y) representing the transition position, and read the transition signal phase_rdata (x,y) stored previously. The transition detector 210 detects the transition according to the video input signal (VBI data) transmitted by the VBI decoder 120. As shown in FIG. 4, the video input signal (VBI data) has transition at a point A, and a phase count signal phase_cnt [1:0] is set to be 1. Therefore, the transition signal phase (x,y) of the video input signal (VBI data) is 1. The pre-stored transition signals phase_rdata (x,y) are stored in the memory 240. The transition detector 210 is mainly used for detecting the transition of the video input signal (VBI data), which can be achieved by prior-art skills, for example, an exclusion or gate logic circuit. Therefore, the detailed description is not necessary given here.

In step S330, determine if the transition signal phase (x,y) of the video input signal (VBI data) is larger than the pre-stored transition signal phase_rdata (x,y). If the signal phase (x,y) is larger than the signal phase_rdata (x,y), perform the step S340, and if the signal phase (x,y) is not larger than the signal phase_rdata (x,y), perform the step S350 and store the transition signal phase (x,y) in the memory 240.

In step S340, that the signal phase (x,y) is larger than the signal phase_rdata (x,y) represents the transition position of the over-sampled signal is changing. For example, at the point A in FIG. 4, the phase (x,y) value is 1, and if the pre-stored phase_rdata (x,y) value is 0, then it means transition occurs at the position when the phase_cnt value is 0 and 1. Therefore, in step S340, the value sample_on is renewed to be 2. At the point C of FIG. 4, the phase (x,y) value is 0, and if the pre-stored phase_rdata (x,y) value is 1, then the value sample_on remains to be 2 in step S340.

In step S350, the value phase (x,y) is not larger than the value phase_rdata (x,y), which means that the transition position of the over-sampled signal is not changed and thus the value sample_on remains unchanged. The data output device 230 performs an output process of the video input signal (VBI data). The data output device 230 determines the output time point according to the used multiple of sampling frequency. For example, in the embodiment using four-time frequency to over-sample the input signal, the video input signal (VBI data) can be outputted at the next timing after the position of phase_rdata (x,y). At this time, the value sample_on is 2, so the output of the video input signal (VBI data) can be provided when the value phase_cnt [1:0] is 2 to obtain the sampled VBI data (SVBI(x,y)) as shown in FIG. 4.

If the five-time frequency is used to over-sample the input signal, the video input signal (VBI data) can be outputted at the next second timing after the position of the phase_rdata (x,y). In case that six-time frequency is used to over-sample the input signal, the video input signal (VBI data) can be outputted at the next third timing after the position of the phase_rdata (x,y). The output time point is preferably selected such that the video input signal (VBI data) appears in a stable state.

As shown in FIG. 4, the sampling time point sample_on is still located at the middle part of the video input signal (VBI data). That is, better and more stable sampling data can be obtained by using the method of the invention.

In step S360, determine if the process is performed at the end of a horizontal line. If it reaches the end of the horizontal line, perform the step S370, and if it doesn't reach the end, perform the step S380. In step S380, for the process is performed at the end of a horizontal line, the value x is added by 1 so as to sample the next pixel at the same horizontal line. In step S370, determine if the process is performed at the end of a picture frame. If it reaches the end of the picture frame, repeat the step S310, and if it doesn't reach the end, perform the step S390. In step S390, add the value y by 1 and set the value x to be 1 so as to sample the first pixel at the next horizontal line.

In another embodiment, the data receiving apparatus can also receive the synchronism signal V sync or H sync as a determining basis in steps S360 and S370.

In another preferred embodiment, for the conventional VBI decoder 120 may have to perform normal operation by using the synchronism signal Vsync or Hsync. The data receiving apparatus can also receive the synchronism signal Vsync or Hsync as a reset signal.

In another embodiment, the memory can be a first in first out (FIFO) buffer. Taking three-time sampling frequency as an example, if the FIFO can store ten sets of phase (x,y) values, and the content of the ten sets of phase (x,y) is 0 and 1, the value sample_on has to be set as 2. After a period of time, the content of the values phase (x,y) is 2 and 0 (the previous data phase (x,y) have been deleted), and the value sample_on has to be set as 1. Therefore, the sampling data can be avoided to be output at the position of transition and selected to be output at the better and more stable position. Furthermore, in the system having poor signal receiving quality, higher over-sampling frequency can be used to prevent receiving errors.

According to the description mentioned above, although the transmitter (VBI decoder) and the receiver (VBI receiver) have no any synchronism mechanism as transmitting data (VBI data), the receiver (VBI receiver) can do sampling on the middle part of the VBI data to obtain better and more stable sampling data by using the skills of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data receiving apparatus, comprising:
   an over-sampling circuit, to over-sample digital data and output a plurality of over-sampled signals, wherein the digital data are vertical blanking interval (VBI) data;
   a transition detector, to detect the transition of the over-sampled signals, and output a transition signal representing the transition position;
   a data selector, coupled to the transition detector, to record the transition signal and output a position signal according to the transition signal and at least a previous transition signal; and
   a data output device, coupled to the data selector, to output digital output data from the over-sampled signals according to the position signal;
   wherein the position shown by the position signal is different from the position shown by the transition signals.

2. The apparatus of claim 1, wherein the data selector further comprises a memory, for storing the transition signals.

3. The apparatus of claim 2, wherein the memory is a first in first out (FIFO) buffer, for storing the latest transition signals.

4. The apparatus of claim 1, wherein the data selector receives a reset signal and is reset by the reset signal.

5. The apparatus of claim 4, wherein the data selector receives a reset signal and is reset by the reset signal and the reset signal corresponds to a vertical synchronization signal or a horizontal synchronization signal or both.

6. The apparatus of claim 1 is a vertical blanking interval (VBI) receiver.

7. The apparatus of claim 6, wherein the VBI receiver is coupled to a VBI decoder and the digital data are VBI data generated by the VBI decoder.

8. A data recovering method, comprising:
   over-sampling digital data to generate an over-sampled signal;
   detecting the transition of the over-sampled signal and outputting a transition signal representing the transition position;
   outputting a sampling position signal according to the transition signal and at least a previous transition signal stored in a storage location;
   outputting digital output data from the over-sampled signal according to the sampling position signal; and
   resetting the storage location according to a reset signal, wherein the reset signal corresponds to a horizontal synchronization signal or a vertical synchronization signal or both.

9. The method of claim 8, further comprising:
   recording the transition signal and at least a previous transition signal in the storage location.

10. The method of claim 8, wherein the digital data are vertical blanking interval (VBI) data.

11. The method of claim 8, further comprising storing and renewing the transition signals by a first in first out method.

12. The method of claim 8, wherein the position shown by the sampling position signal is different from the position shown by the transition signals.

13. A data receiving apparatus, comprising:
   an over-sampling circuit, to over-sample digital data and output a plurality of over-sampled signals;
   a transition detector, to detect the transition of the over-sampled signals, and output a transition signal representing the transition position;
   a data selector, coupled to the transition detector, to record the transition signal and output a position signal according to the transition signal and at least a previous transition signal; and
   a data output device, coupled to the data selector, to output digital output data from the over-sampled signals according to the position signal;
   wherein the data selector receives a reset signal and is reset by the reset signal, and the reset signal corresponds to a vertical synchronization signal or a horizontal synchronization signal or both.

14. The apparatus of claim 13, wherein the apparatus is coupled to a VBI decoder and the digital data is generated by the VBI decoder.

15. A data recovering method, comprising:
   over-sampling digital data to generate an over-sampled signal, wherein the digital data are vertical blanking interval (VBI) data;
   detecting the transition of the over-sampled signal and outputting a transition signal representing the transition position;
   outputting a sampling position signal according to the transition signal and at least a previous transition signal stored in a storage location; and
   outputting digital output data from the over-sampled signal according to the sampling position signal;
   wherein the position shown by the sampling position signal is different from the position shown by the transition signals.

16. The method of claim 15, further comprising:
   resetting the storage location according to a reset signal.

17. The method of claim 16, wherein the reset signal is a horizontal synchronization signal or a vertical synchronization signal or both.

18. A data receiving method, comprising:
   over-sampling digital data to output a plurality of over-sampled signals;
   detecting the transition of the over-sampled signals to output a transition signal representing the transition position;
   recording the transition signal in a storage location;
   comparing the transition signal and at least a previous transition signal previously stored in the storage location to output a position signal; and
   outputting digital output data from the over-sampled signals according to the position signal;
   wherein the position shown by the position signal is different from the position shown by the transition signals.

19. The method of claim 18, further comprising:
   resetting the storage location according to a reset signal, wherein the reset signal corresponds to a vertical synchronization signal or a horizontal synchronization signal or both.

20. The method of claim 18, wherein the digital data are vertical blanking interval (VBI) data.

* * * * *